United States Patent [19]
Ono et al.

[11] Patent Number: 5,483,439
[45] Date of Patent: Jan. 9, 1996

[54] DIGITAL SERVO CONTROL SYSTEM

[75] Inventors: Hiroyuki Ono, Fujisawa; Koichi Ikarugi, Chigasaki, both of Japan

[73] Assignee: International Business Machines Corporation, Armonk, N.Y.

[21] Appl. No.: 132,611

[22] Filed: Oct. 6, 1993

[30] Foreign Application Priority Data

Oct. 6, 1992 [JP] Japan ................................. 4-267632

[51] Int. Cl.$^6$ ........................................... G05B 13/04
[52] U.S. Cl. .................... 364/149; 364/165; 364/176; 318/561
[58] Field of Search .............................. 364/149, 150, 364/151, 148, 164, 165, 176, 177, 152, 157, 158; 318/561

[56] References Cited

U.S. PATENT DOCUMENTS

| | | | |
|---|---|---|---|
| 4,679,103 | 7/1987 | Workman | 360/77 |
| 4,760,397 | 7/1988 | Piccolruaz | 342/75 |
| 4,769,766 | 9/1988 | Tung | 364/157 X |
| 5,019,958 | 5/1991 | Varga | 363/97 |
| 5,091,843 | 2/1992 | Peczkowski | 364/164 X |
| 5,220,373 | 6/1993 | Kanaya | 395/11 X |
| 5,311,421 | 5/1994 | Nomura et al. | 364/157 |
| 5,353,207 | 10/1994 | Keeler et al. | 364/148 X |

FOREIGN PATENT DOCUMENTS 0392966  10/1990  European Pat. Off. ........ B64C 11/30

*Primary Examiner*—Joseph Ruggiero
*Attorney, Agent, or Firm*—Roy W. Truelson; Richard E. Billion

[57] ABSTRACT

In a digital closed loop servo control system, state variables of a plant are input to an inverse system having an opposite characteristic to an internal model, and the output of the inverse system is input to the internal model. If the state variables of the plant cannot be directly observed, a state estimator is used. In that case, the inverse system receives input and output of the plant and provides output thereof to the state estimator. Input of the internal model may be inputted to the state estimator instead of inputting the input of the plant to the inverse system. In this manner, it is possible to provide a digital servo control system in which the number of bits required in calculation (dynamic range) does not depend on the amplitude of the target value.

9 Claims, 4 Drawing Sheets

DIGITAL SERVO CONTROL SYSTEM

FIELD OF THE INVENTION

The present invention relates to a digital servo control system, and more particularly to a digital servo control system using the state feedback method.

BACKGROUND OF THE INVENTION

Digital servo systems using the state feedback method have been widely used in the fields such as hard disk drive (HDD), robotics and aircraft to improve control performance. FIG. 1 shows a schematic configuration of such a system. As seen, state variables representing the internal state of a plant 10 (for example, an actuator of HDD) are fed back, through a multiplier 12, to the input side of the plant 10. Input to the plant 10 is obtained by adding outputs of the multipliers 12 and 14. Input to the multiplier 14 is provided by an internal model 16 which receives a signal indicating a difference between the output of the plant 10 and a target value.

It is well known in the art that in designing such a servo system as shown in FIG. 1, it is important to make the output of a plant follow a target value without any steady state deviation, and to this end it is necessary to insert a model for generating a target value (called an internal model) in a closed loop of a control system. The internal model 16 is inserted for this purpose. For example, if a target value is constant (step input), an integrator may be used as the internal model because such a target value can be generated by providing an appropriate initial value to the integrator. In the servo system of FIG. 1, feedback gains to be obtained in the servo system design are coefficients −F1 and −F2 which are multiplied in the multipliers 12 and 14, respectively.

If the state variables of the plant 10 cannot be directly observed, a state estimator (also called observer) 18 is used for estimating the state variables based on the input and output of the plant, as shown in FIG. 2. A general discussion about a state estimator is found, for example, in Iwai et al, Observer, Corona (1988). Also, U.S. Pat. No. 4,679,103 assigned to the present assignee discloses a digital servo control system for controlling a data recording disk file using such a state estimator in which the state estimator receives a position error signal (PES) obtained by demodulating servo information read from a disk and input to an actuator which is a plant, and outputs estimated values of position, velocity, and acceleration of a head which are state variables.

Now the systems of FIG. 1 and FIG. 2 are described in more detail. Assuming that a plant is a controllable and observable linear system, and its input, output and state variables at a sampling time $i(\geq 0)$ are $u(i)$, $y(i)$ and $x(i)$, respectively, then a mathematical model of its discrete time system is generally represented by the following equations.

[Equation 1]

$$x(i+1)=A \cdot x(i)+B \cdot \{u(i)+d\}$$

[Equation 2]

$$y(i)=C \cdot x(i)$$

Equations 1 and 2 are called state and output equations, respectively. In the above equations, coefficients A, B and C are determined from the characteristics of a plant and d represents a constant input disturbance. Generally, each of d, u, x and y in the above equations takes a vector form comprising a plurality of elements and the coefficients A, B and C are expressed by matrices. To construct a servo system of type 1 for such a plant, a value $v(i)$ obtained from integration of a difference between a target value r and a current value $y(i)$ has been conventionally used to form an expanded system:

[Equation 3]

$$\begin{bmatrix} x(i+1) \\ v(i+1) \end{bmatrix} = \begin{bmatrix} A & 0 \\ C & 1 \end{bmatrix} \begin{bmatrix} x(i) \\ v(i) \end{bmatrix} + \begin{bmatrix} B \\ 0 \end{bmatrix} u(i) + \begin{bmatrix} Bd \\ -r \end{bmatrix}$$

and the following state feedback has been applied.

[Equation 4]

$$u(i)=-F1 \cdot x(i)-F2 \cdot v(i)$$

FIG. 1 and FIG. 2 can be redrawn according to the above equations as shown in FIG. 3 and FIG. 4, respectively. As seen, the internal model 16 is formed by an integrator including a block 20 which gives a delay of one sample. Assuming a sampling period is T and angular frequency is $\omega$, $Z^{-1}$ in the block 20 is represented by $Z^{-1}=e^{-j\omega T}$. The state estimator 18 in FIG. 4 estimates the state variables $x(i)$ of the plant 10 based on the input $u(i)$ to the plant 10 which is delayed one sample by a block 22 and the output $y(i)$ of the plant 10. Although the state estimator does not output the actual state variables but estimated values, the output thereof is hereafter regarded as $x(i)$ for convenience of explanation. The block 22 is inserted in consideration of the operation time delay.

When the digital servo system using the above-mentioned state feedback method is handled by a digital computer such as a microprocessor or the like, a problem arises that the number of bits required for the calculation (this is called "dynamic range") should be increased and, therefore, the calculation time would become longer, as compared with the conventional algorithm based on the transfer function method. This is due to the fact that the transfer function method is based on only a difference between the target and current values while the state feedback method has to process the absolute quantity of the current value and therefore requires a large dynamic range in all calculation processes if the target value varies widely.

More specifically, if the state feedback expressed by Equation 4 is stable and the output $y(i)$ finally becomes equal to the target value r, that is, $y(\sim) \to r$, the systems of FIG. 3 and FIG. 4 function as servo systems, but $x(\sim)$ does not reach 0 and a non-zero state variable remains where $C \cdot x(\infty) \to r$. Further, to hold the system static, it is necessary to balance the input with the disturbance so that $u(\infty) \to -d$. Thus,

[Equation 5]

$$f1 \cdot x(\infty)+F2 \cdot v(\infty)=d \ (const.)$$

Since $x(\infty)$ is non-zero and has a term proportional to the amplitude of the target value r, the absolute value of $v(\infty)$ also increases in proportion to r. Therefore, if the target value varies widely in such digital servo systems as shown in FIG. 3 and FIG. 4, the required dynamic range would increase considerably. This would be a serious problem for the implementation by the leading 16 bit fixed point DSP (Digital Signal Processor) or 32 bit floating point DSP.

SUMMARY OF THE INVENTION

Accordingly, it is an object of the present invention to provide a digital servo control system in which the dynamic range of the calculation does not depend on the amplitude of a target value.

Another object of the present invention is to provide a digital servo control system to which the conventional control theory may be applied without modification, with respect to the gain setting and the configuration of the state estimator.

The present invention relates to a digital servo control system in which a signal representing a difference between a target value and output of a plant is inputted to an internal model and output of the internal model is inputted to the plant, characterized in that the state variables of the plant are inputted to a model (hereinafter called an inverse system) having an opposite characteristic to the internal model and output of the inverse system is inputted to the internal model. If the state variables of the plant cannot be directly observed, a state estimator is used. In that case, the inverse system receives the input and output of the plant. The state estimator estimates the internal state of the plant based on the output of the inverse system and provides its output, that is, estimated values to the internal model. Since the internal model is essentially an integrator, then the inverse system is a differentiator. The differentiator outputs a difference of received signals based on which the calculation of input to the plant (and the calculation of estimated values by the state estimator) is performed so that the dynamic range required for the calculation in a servo system may be reduced as compared with the prior art in which the current value of a signal was used, which results in reduced load for the calculation.

The input of the internal model may be provided to the state estimator through delay means instead of providing the input of the plant to the inverse system. These are mathematically equivalent to each other and either may be chosen as required, details of which will be described below.

DETAILED DESCRIPTION OF THE PREFERRED EMBODIMENT

Figure 5:
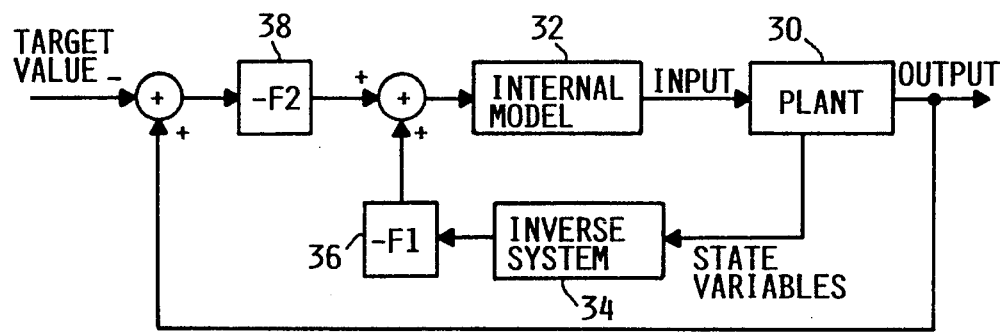
FIG. 5 is a block diagram showing a digital servo control system according to the present invention.

FIG. 5 shows a schematic configuration of a digital servo control system according to the present invention. The system of FIG. 5 includes internal model 32 which provides input to plant 30 (for example, an actuator of HDD), and inverse system 34 which has an opposite characteristic to internal model 32 and receives state variables of plant 30. The output of inverse system 34 is multiplied by −F1 in multiplier 36 and then fed back to the input of internal model 32. Multiplier 38 multiplies a difference between the output of plant 30 and a target value by −F2 and then provides the product to internal model 32. The input to internal model 32 is the sum of the outputs of multipliers 36 and 38.

Figure 1:
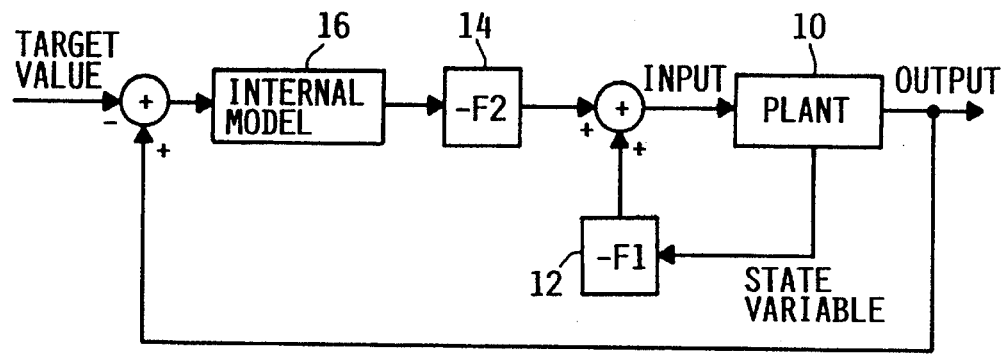
FIG. 1 is a block diagram showing a conventional digital servo control system using a state feedback method.

In FIG. 5, since internal model 32 and inverse system 34 offset each other in a closed loop which runs from plant 30 up to internal model 32 through inverse system 34 and multiplier 36, only state feedback from the plant remains in the closed loop. On the other hand, a loop for inputting a difference between the output of plant 30 and a target value to plant 30 through multiplier 38 and internal model 32 is the same as in FIG. 1. Therefore, seeing the entire servo system, the systems of FIG. 1 and FIG. 5 are physically analogous to each other. However, they are different from each other with respect to the dynamic range of calculation. In FIG. 5, the output of internal model 32 is a control input which has a value for balancing against disturbance in a steady state. If the output of plant 30 becomes equal to the target value at that time, the input to internal model 32 approaches zero, regardless of the amplitude of the target value. This is due to the fact that the internal model is essentially an integral system, Accordingly, the present invention eliminates the problem that the dynamic range required for the calculation changes depending on the amplitude of the target value. However, another problem occurs that the dynamic range required for basic calculation in which the target value is not involved would increase since inverse system 34 (this may be a differential system) is inserted where noise in high frequency bands is amplified. Therefore, the present invention may be preferably implemented in a processor having a floating point unit though the high frequency noise does not have so much effect if the order of the differential system is low.

Figure 2:
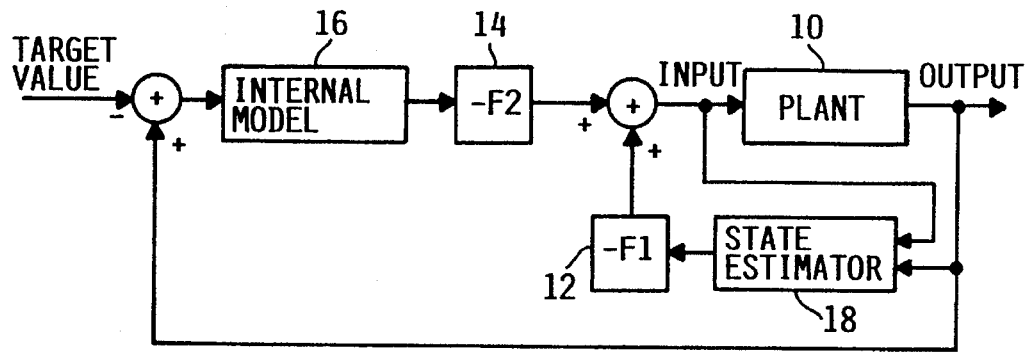
FIG. 2 is a block diagram showing a conventional digital servo control system using a state estimator.
Figure 6:
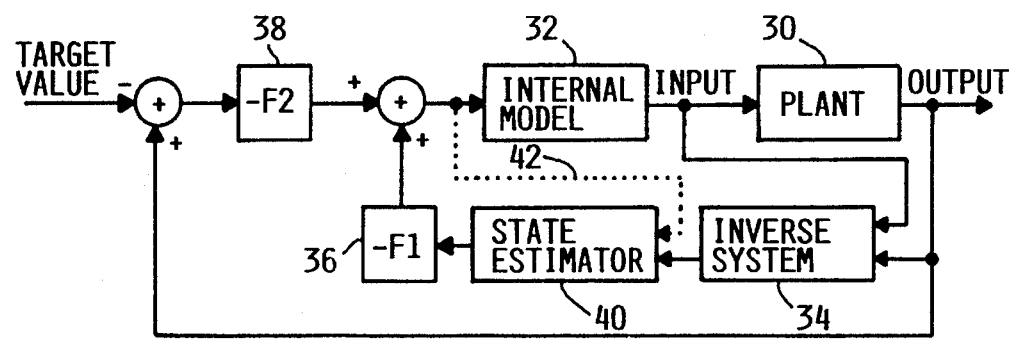
FIG. 6 is a block diagram showing a digital servo control system according to the present invention which uses a state estimator.

If the state variables of plant 30 cannot be directly observed, state estimator 40 is used as shown in FIG. 6. FIG. 6 differs from FIG. 5 in that inverse system 34 receives the input and output of the plant and inputs the output thereof to state estimator 40. State estimator 40 estimates the state variables of plant 30 based on the input from inverse system 34 and provides the estimated values to multiplier 36. The configuration other than the above is the same as FIG. 5. For the same reason as in FIG. 5, the system of FIG. 6 is physically analogous to the system of FIG. 2. In the system of FIG. 6, the input to internal model 32 may be inputted to state estimator 40, as indicated by a dotted line 42, instead of inputting the input of plant 30, that is, the output of internal model 32 to inverse system 34, details of which will be described later. Considering the calculation by the microprocessor, the former path is advantageous since the calculation of inverse system 34 is unnecessary.

Figure 7:
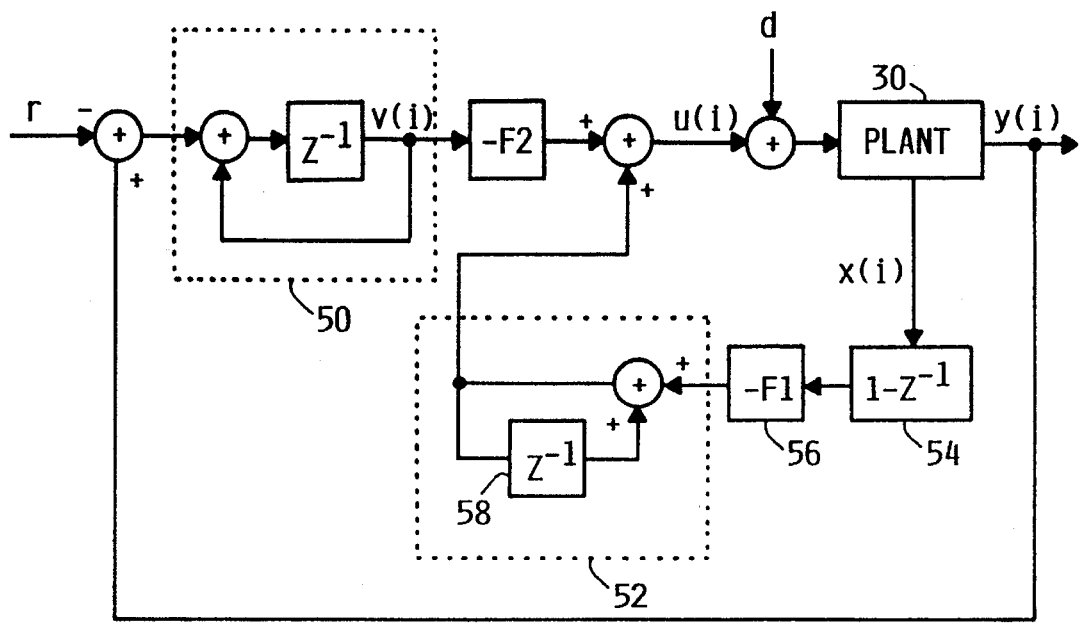
FIG. 7 is a block diagram for explaining the theoretical background of the present invention.

Next, a theoretical background of the present invention is described. First, a Z transformation X(Z) of state variables x(i) of the plant at a sampling time i is represented by the following equation:

[Equation 6]

$$X(Z) = 1/1 - Z^{-1})(1 - Z^{-1})X(Z)$$

where $(1/1-Z^{-1})$ and $(1-Z^{-1})$ on the right side represent integral and differential, respectively. Assuming for simplicity that the state variables x(i) can be directly observed, a block diagram can be drawn as shown in FIG. 7, based on Equation 6. Comparing FIG. 7 with FIG. 3, it is seen that integrator 50 is the same as integrator 16 in FIG. 3, but FIG. 7 differs from FIG. 3 in that a second integrator 52 and differentiator 54 are inserted in the inner closed loop. However, FIG. 7 is functionally equivalent to FIG. 3 since integrator 52 and differentiator 54 offset each other.

Representing a difference between the output y(i) of the plant and the target value r, its Z transformation and Z transformation of v(i) by e(i), E(Z) and V(Z), respectively, the following equation is given at integrator 50.

[Equation 7]

$$(E(Z)+V(Z))Z^{-1}=V(Z)$$

Hence,

[Equation 8]

$$E(Z)Z^{-1}=V(Z)(1-Z^{-1})$$

On the other hand, as is obvious from FIG. 7, since the output of integrator 52 is u(i)–F2·v(i) which is equal to the sum of the output of multiplier 56, –F1(1–$Z^{-1}$)x(i), and the output of delay element 58, {u(i)–F2·v(i)}$Z^{-1}$, the following equation can be written with respect to the input to the plant u(i), in which U(Z) is a Z transformation of u(i).

$$\begin{aligned} U(Z) &= -F2 \times V(Z) + \{U(Z) - F2 \times V(Z)\}Z^{-1} - \quad \text{[Equation 9]} \\ &\quad F1(1-Z^{-1})X(Z) \\ &= (1-Z^{-1})^{-1}\{-F2 \times V(Z)(1-Z^{-1}) - \\ &\quad F1(1-Z^{-1})X(Z)\} \\ &= (1-Z^{-1})^{-1}\{-F2 \times E(Z)Z^{-1} - \\ &\quad F1(1-Z^{-1})X(Z)\} \end{aligned}$$

Figure 8:
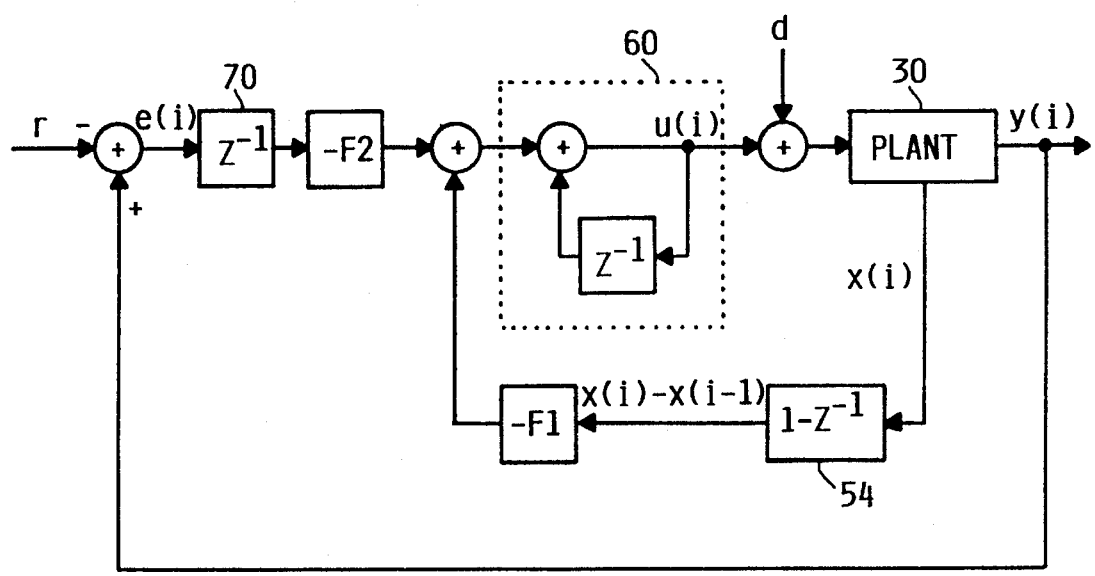
FIG. 8 is a block diagram showing a digital servo control system in which two integrators in FIG. 7 are unified.

The term $(1-Z^{-1})^{-1}$ in the right side of the above equation represents an integrator in which a delay element $Z^{-1}$ is contained in a feedback loop and, therefore, the entire block diagram can be drawn as shown in FIG. 8. Integrator 60 in FIG. 8 is formed by unifying the two integrators 50 and 52 in FIG. 7, and corresponds to internal model 32 in FIG. 5.

Differentiator 54 corresponds to inverse system 34 and outputs x(i)–x(i–1). When the digital servo control system of FIG. 8 is implemented, only the calculation of y(i)–r and x(i)–x(i–1) should handle numeric values having a large dynamic range depending on the target value r. Since such calculation is merely a subtraction, load for the calculation is small. Moreover, these finally converge to zero.

Figure 3:
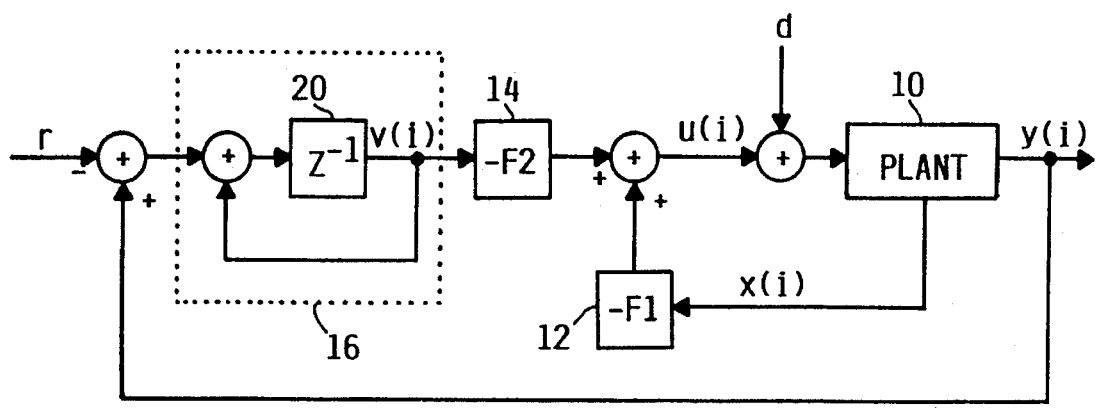
FIG. 3 is a block diagram where a first order integrator is used as an internal model in the system of FIG. 1.

In the case of FIG. 3, since the absolute values of v(i) and x(i) proportional to the target value r were used in the calculation, a large dynamic range was required. However, according to the present invention, the difference (output of differentiator 54) between the current value and a sample value immediately before it, is fed back and then integrated by integrator 60 instead of using such absolute values so that the dynamic range required for the calculation may be reduced.

Figure 4:
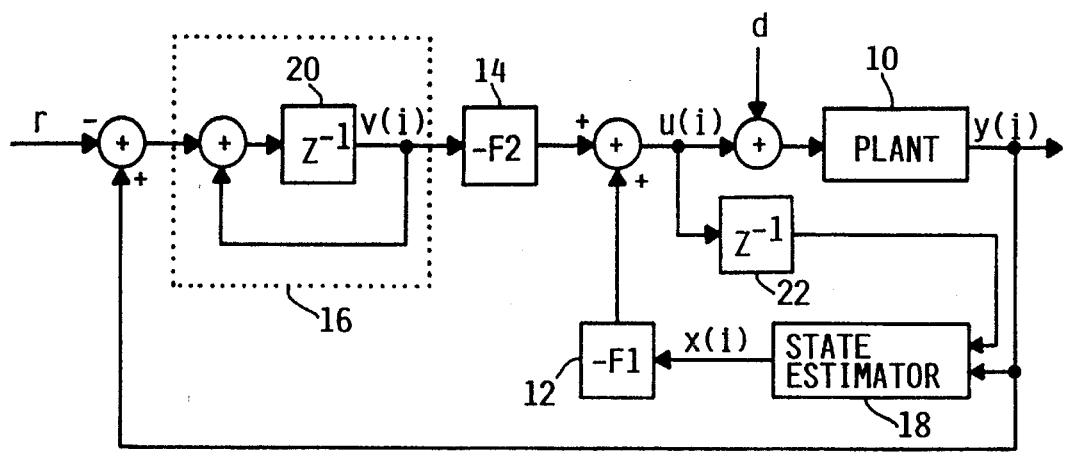
FIG. 4 is a block diagram where a first order integrator is used as an internal model in the system of FIG. 2.
Figure 9:
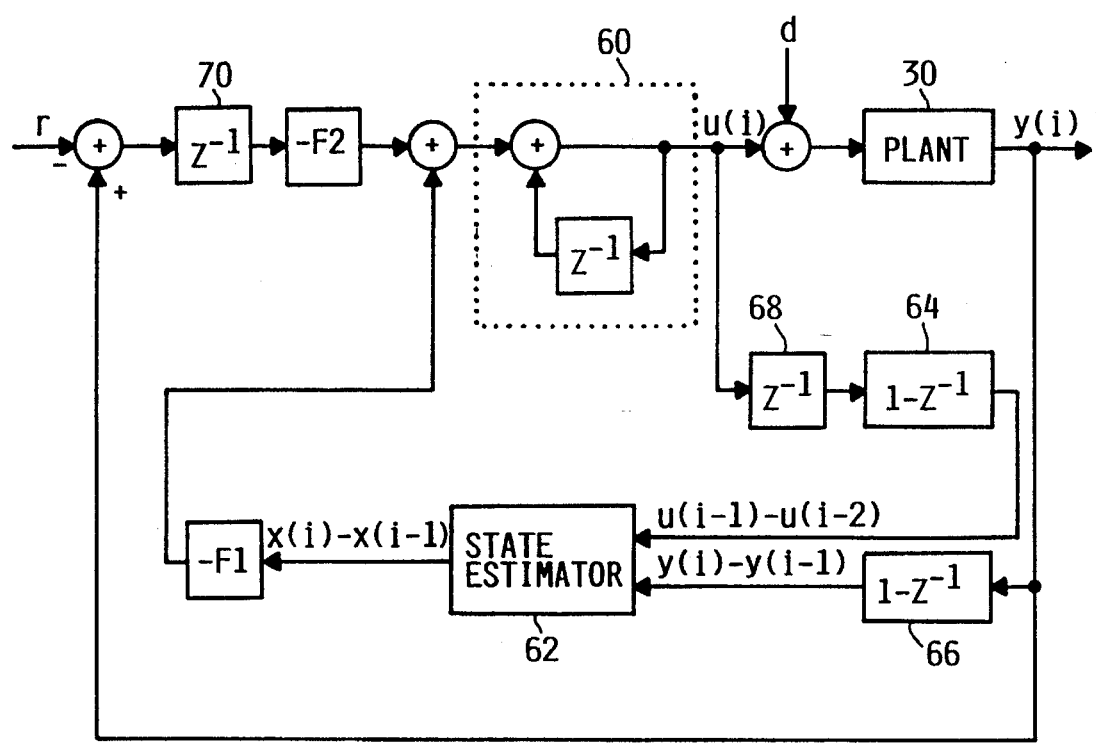
FIG. 9 is a block diagram where a state estimator is used in the system of FIG. 8.

If the state variables x(i) of the plant cannot be directly observed, a state estimator is used as shown in a block diagram of FIG. 9. In FIG. 9, state estimator 62 and differentiators 64 and 66 correspond to state estimator 40 and inverse system 34 in FIG. 6, respectively. Differentiator 64 receives a control input u(i–1) delayed by one sample in delay element 68 and outputs u(i–1)–u(i–2). Differentiator 66 receives a control output y(i) and outputs y(i)–y(i–1). State estimator 62 calculates an estimated value for the difference x(i)–x(i–1) of state variables of plant 30 based on the outputs of differentiators 64 and 66. In FIG. 9, x(i)–x(i–1) indicated at the output of state estimator 62 is actually an estimated value. Although the input and output of state estimator 62 are different from those shown in FIG. 4, the configuration thereof may be the same as that of conventional state estimator 18.

The embodiment of FIG. 9 may also reduce the dynamic range independently of the magnitude of the target value r since the calculation is performed based on a difference between sample values. Although the input sample value u(i) is newly used in FIG. 9, it does not affect the dynamic range since it converges to –d and its difference converges to zero when i→∞.

The same result can be obtained by connecting delay element 68 to the input of integrator 60 and inputting its output u(i–1)–u(1–2) delayed by one sample directly to state estimator 62 since the input to integrator 60 is equal to u(i)–u(i–1). In that case, differentiator 64 is no longer required which, therefore, reduces the calculation. As described in the Background section above, delay element 68 is inserted in consideration of the operation time delay in a digital computer such as a microprocessor or the like. Additionally, if an expanded system is assumed to be:

[Equation 10]

$$\begin{bmatrix} x(i+1) \\ v(i+1) \end{bmatrix} = \begin{bmatrix} A & 0 \\ CA & 1 \end{bmatrix} \begin{bmatrix} x(i) \\ v(i) \end{bmatrix} + \begin{bmatrix} B \\ CB \end{bmatrix} u(i) + \begin{bmatrix} Bd \\ -r \end{bmatrix}$$

and the feedback gains are established thereon, delay element 70 in FIG. 8 and FIG. 9 may be removed.

Although the preferred embodiments of the present invention have been described without specifying the plant, the digital servo control system of the present invention may be practically applied to any plant so far as an internal model is not a high order integral system. As mentioned above, since the present invention uses an inverse system (differential system) having an opposite characteristic to an internal model, the effect of high frequency noise becomes large and the dynamic range required for basic calculation increases accordingly as the order of the inverse system becomes high. For example, in case of a type 1 servo system in which an internal model is a first order integrator, the present invention may be implemented by a processor including a 24-bit or 32-bit floating point arithmetic unit.

An actuator of a hard disk drive (HDD) is a typical plant suitable for implementation of the present invention. In that case, since a purpose of control is to position a head on a particular track, a target value (track number) can be assumed to be a step input, and thus an internal model may be a first order integrator. Control input u(i) to be provided by the digital servo control system of the present invention in response to the target value is a current control signal for a voice coil motor (VCM). The actuator outputs servo information read by the head. State variables used in the calculation are position and velocity of a head and differentiator 54 in FIG. 8 (or state estimator 62 in FIG. 9) outputs the respective differences. Setting of the coefficients –F1 and –F2 is not described here since it is not directly related to the present invention and they can be easily obtained in accordance with the conventional control theory.

According to the present invention, a digital servo control system in which the dynamic range of calculation does not depend on the magnitude of a target value can be realized.

What is claimed is:

1. A digital servo control system in which a signal representing a difference between a target value and output of a plant is inputted to an internal model and output of said internal model is inputted to said plant, comprising:

an inverse system having an opposite characteristic to that of said internal model and receiving state variables of said plant;

means for feeding output of said inverse system back to the input of said internal model;

a first multiplier included in said feedback means for multiplying the output of said inverse system by a predetermined first coefficient; and a second multiplier for multiplying a difference between said target value and the output of said plant by a predetermined second coefficient, wherein a sum of the outputs of said first multiplier and said second multiplier is input to said internal model.

2. The digital servo control system according to claim 2, wherein said internal model is an integrator and said inverse system is a differentiator.

3. The digital servo control system according to claim 2, wherein both said integrator and said differentiator are of the first order.

4. A digital servo control system in which a signal representing a difference between a target value and output of a plant is inputted to an internal model and output of said internal model is inputted to said plant, comprising:

an inverse system having an opposite characteristic to that of said internal model and receiving the input and output of said plant;

a state estimator for estimating the internal state of said plant based on output of said inverse system;

means for feeding output of said state estimator back to the input of said internal model;

a first multiplier included in said feedback means for multiplying the output of said state estimator by a predetermined first coefficient; and a second multiplier for multiplying a difference between said target value and the output of said plant by a predetermined second coefficient, wherein a sum of outputs of said first multiplier and said second multiplier is input to said internal model.

5. A digital servo control system in which a signal representing a difference between a target value and output of a plant is inputted to an internal model and output of said internal model is inputted to said plant, comprising:

an inverse system having an opposite characteristic to that of said internal model and receiving the output of said plant;

a state estimator for estimating the internal state of said plant based on output of said inverse system and input of said internal model;

means for feeding output of said state estimator back to the input of said internal model;

a first multiplier included in said feedback means for multiplying the output of said state estimator by a predetermined first coefficient; and a second multiplier for multiplying a difference between said target value and the output of said plant by a predetermined second coefficient, wherein a sum of outputs of said first multiplier and said second multiplier is input to said internal model.

6. The digital servo control system according to claim 5, wherein said internal model is an integrator and said inverse system is a differentiator.

7. The digital servo control system according to claim 6, wherein both said integrator and said differentiator are of the first order.

8. The digital servo control system according to claim 5, wherein if it is assumed that the input, output and state variables of said plant are represented by $u(i)$, $y(i)$, and $x(i)$, respectively, at a sampling time $i$, said state estimator receives $y(i)-y(i-1)$ and $u(i-1)-u(i-2)$ as input and outputs an estimated value of $x(i)-x(i-1)$.

9. The digital servo control system according to claim 8, wherein said second multiplier receives said difference after delayed by one sample.

* * * * *